United States Patent
Knighton et al.

(10) Patent No.: US 9,571,638 B1
(45) Date of Patent: Feb. 14, 2017

(54) SEGMENT-BASED QUEUEING FOR AUDIO CAPTIONING

(71) Applicant: NEDELCO, INC., Aurora, NE (US)

(72) Inventors: Jeffery F. Knighton, Vail, AZ (US); Seth Marks, Benson, AZ (US); William Chad Sumsion, Draper, UT (US); Dixie Ziegler, Aurora, NE (US)

(73) Assignee: NEDELCO, INC., Aurora, NE (US)

( * ) Notice: Subject to any disclaimer, the term of this patent is extended or adjusted under 35 U.S.C. 154(b) by 0 days.

(21) Appl. No.: 15/288,116

(22) Filed: Oct. 7, 2016

(51) Int. Cl.
| | |
|---|---|
| *H04M 3/58* | (2006.01) |
| *H04M 3/42* | (2006.01) |
| *G10L 21/10* | (2013.01) |
| *G10L 15/26* | (2006.01) |
| *G10L 15/05* | (2013.01) |
| *H04M 1/247* | (2006.01) |

(52) U.S. Cl.
CPC .......... *H04M 3/42391* (2013.01); *G10L 15/05* (2013.01); *G10L 15/26* (2013.01); *G10L 21/10* (2013.01); *H04M 1/2475* (2013.01)

(58) Field of Classification Search
CPC ............ H04M 3/50; H04M 3/58; H04M 3/51; H04M 2201/60; H04M 2201/40
USPC ......... 379/52, 265.02, 88.01, 88.16; 704/260
See application file for complete search history.

(56) References Cited

U.S. PATENT DOCUMENTS

| | | | |
|---|---|---|---|
| 5,163,081 A * | 11/1992 | Wycherley ........ | H04M 3/42391 379/265.02 |
| 8,325,883 B2 * | 12/2012 | Schultz ............. | H04M 3/42391 370/466 |
| 2001/0047260 A1 * | 11/2001 | Walker ................ | H04M 3/4938 704/260 |

\* cited by examiner

*Primary Examiner* — Melur Ramakrishnaiah
(74) *Attorney, Agent, or Firm* — Foley & Lardner LLP

(57) ABSTRACT

A method includes receiving an audio signal. The method further includes determining segments of audio from the audio signal. The method further includes sending a first segment of the audio signal to a first communication assistant (CA) device. The method further includes sending a second segment of the audio signal to a second CA device. The method further includes receiving a first text string associated with the first segment from the first CA device. The method further includes sending the first text string to a text display device. The method further includes receiving a second text string associated with the second segment from the second CA device. The method further includes sending the second text string to the text display device.

20 Claims, 8 Drawing Sheets

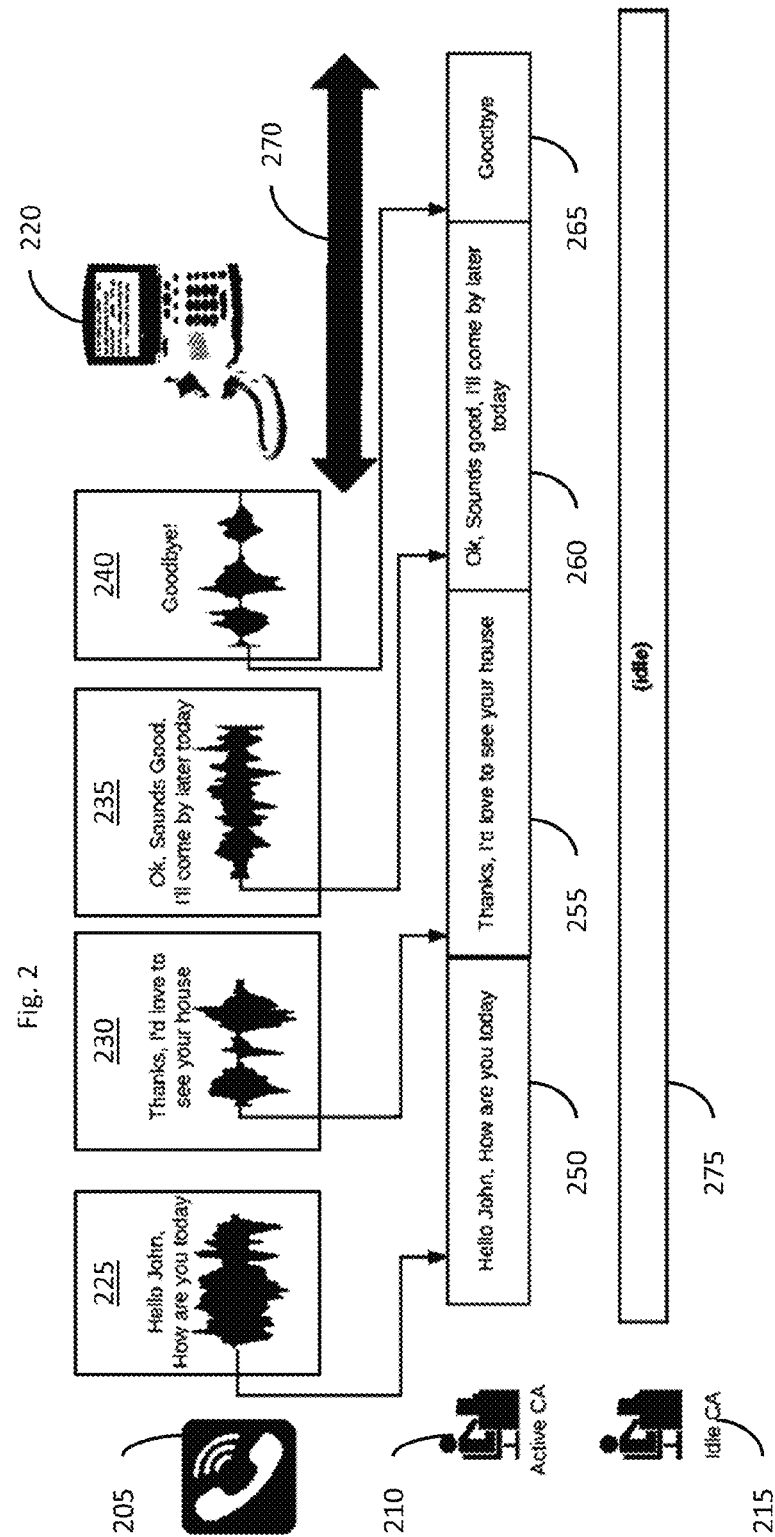

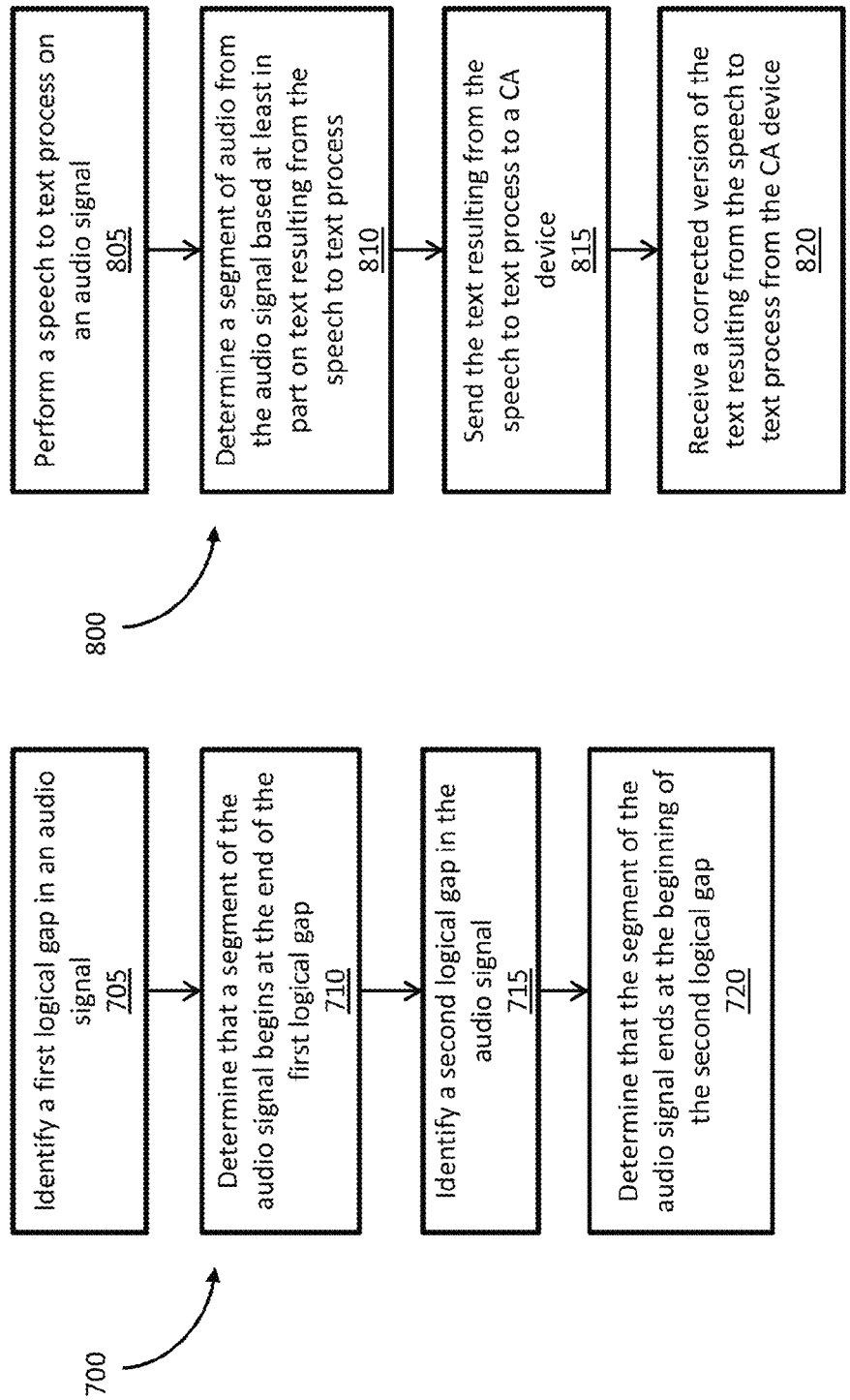

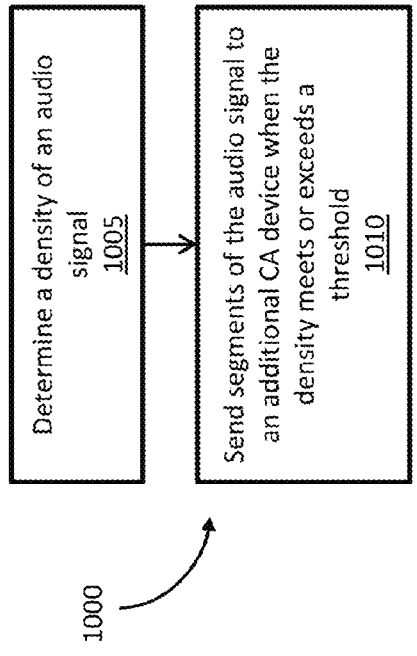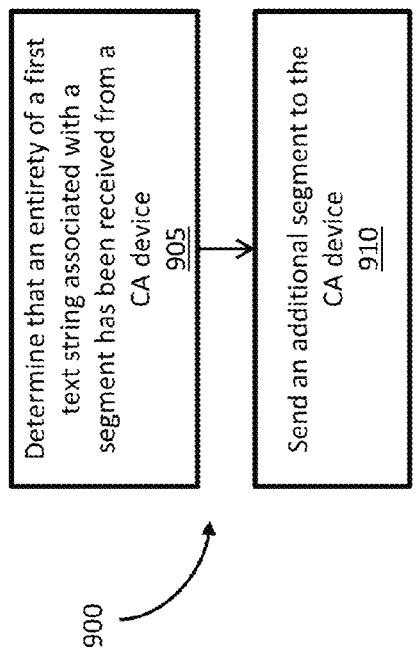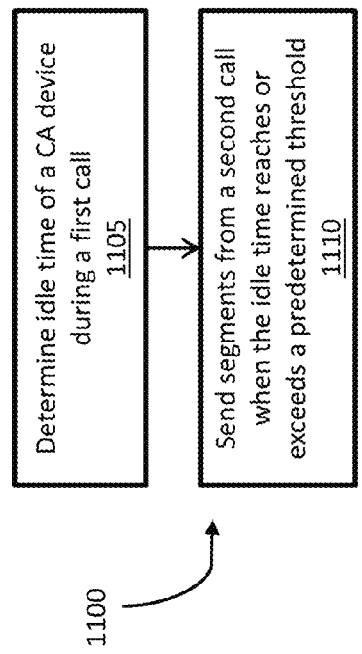
Fig. 10
Fig. 9
Fig. 11

SEGMENT-BASED QUEUEING FOR AUDIO CAPTIONING

BACKGROUND

Various technologies have been developed to enable hard of hearing individuals communicate using telephone communication systems. For example, text telephones, such as Telecommunication Devices for the Deaf (TDD), enable deaf, hard of hearing, speech-impaired individuals to communicate over the telephone with hearing and speaking parties using conventional telephones. In TDD systems, the hard of hearing person typically uses a specially equipped device with a keyboard to type messages and a text display for presenting responses to the caller.

Telecommunication relay services or dual party relay services enable deaf, hard of hearing, speech-impaired individuals to employ text telephones for engaging in a communication session over a telephone network with a person who has a conventional voice telephone. Relay services involve a hard of hearing individual using a keyboard to communicate and a display device to understand what is being said by the other party. The hearing person hears what is being said and uses his voice to communicate. A relay communication assistant (CA) acts as the interface in this situation. The CA relays information from one communication protocol to another. For example, the CA types what the hearing person says and sends the text to the hard of hearing person. The CA can also read aloud text messages from the hard of hearing person so that the hearing person can hear the message.

Other call centers may also employ various telephonic technologies. For example, a customer service center may have an automatic answering service when customers call a customer service number. The automatic answering service may pose questions to the caller. The caller may respond, for example, by inputting numbers on their telephone, which indicates an answer to a question posed to the caller. The automatic answer service may use the responses of the caller to help address the caller's concern or properly route the caller to an operator that can properly address the caller's concern.

SUMMARY

An illustrative method according to a set of instructions stored on the memory of a computing device includes receiving, at a processor of the computing device, an audio signal. The method further includes determining, by the processor, segments of audio from the audio signal. The method further includes sending, by the processor, a first segment of the audio signal to a first communication assistant (CA) device. The method further includes sending, by the processor, a second segment of the audio signal to a second CA device. The method further includes receiving, by the processor, a first text string associated with the first segment from the first CA device. The method further includes sending, by the processor, the first text string to a text display device. The method further includes receiving, by the processor, a second text string associated with the second segment from the second CA device. The method further includes sending, by the processor, the second text string to the text display device.

An illustrative system includes a memory, a processor coupled to the memory, and a first set of instructions stored on the memory and configured to be executed by the processor. The processor is configured to receive an audio signal and determine segments of audio from the audio signal. The processor is further configured to send a first segment of the audio signal to a first communication assistant (CA) device. The processor is further configured to send a second segment of the audio signal to a second CA device. The processor is further configured to receive a first text string associated with the first segment from the first CA device. The processor is further configured to send the first text string to a text display device. The processor is further configured to receive a second text string associated with the second segment from the second CA device. The processor is further configured to send the second text string to the text display device.

An illustrative non-transitory computer readable medium having instructions stored thereon that, upon execution by a computing device, cause the computing device to perform operations. The instructions include instructions to receive an audio signal. The instructions further include instructions to determine, segments of audio from the audio signal. The instructions further include instructions to send a first segment of the audio signal to a first communication assistant (CA) device. The instructions further include instructions to send a second segment of the audio signal to a second CA device. The instructions further include instructions to receive a first text string associated with the first segment from the first CA device. The instructions further include instructions to send the first text string to a text display device. The instructions further include instructions to receive a second text string associated with the second segment from the second CA device. The instructions further include instructions to send the second text string to the text display device.

BRIEF DESCRIPTION OF THE DRAWINGS

Illustrative embodiments will hereafter be described with reference to the accompanying drawings.

FIG. 2 is a diagram demonstrating a captioning service using two communication assistants (CAs) in accordance with an illustrative embodiment.

FIG. 7 is a flow diagram illustrating a method of determining segments in an audio signal in accordance with an illustrative embodiment.

FIG. 8 is a flow diagram illustrating a method of determining segments of an audio signal using a speech to text process in accordance with an illustrative embodiment.

FIG. 9 is a flow diagram illustrating a method of determining when to send signals to a CA device in accordance with an illustrative embodiment.

FIG. 10 is a flow diagram illustrating a method of using signal density in segment-based queuing for audio captioning in accordance with an illustrative embodiment.

FIG. 11 is a flow diagram illustrating a method of using idle time in segment-based queuing for audio captioning in accordance with an illustrative embodiment.

DETAILED DESCRIPTION

Figure 1A:
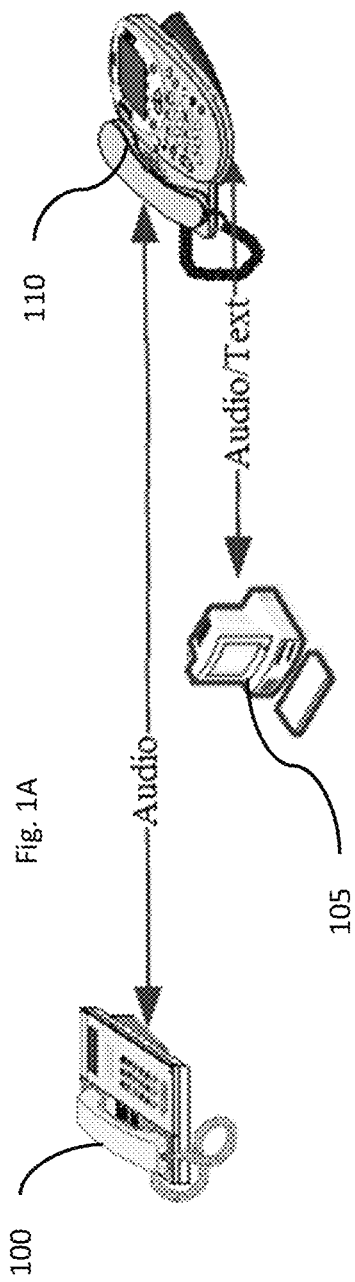
FIG. 1A is a process flow diagram demonstrating a captioned telephone service (CTS) in accordance with an illustrative embodiment.

Described herein are illustrative embodiments for methods and systems that provide for segment-based queuing for audio captioning. For example, in telephone relay or captioned telephone service (CTS) settings, a hard of hearing party may place or receive a voice call. A communication assistant (CA) can hear an audio signal of a hearing party and transcribe the audio signal into text that is sent to a device of the hard of hearing party, so that the hard of hearing party can read what the hearing party is saying. In various embodiments, a CA may be an automated speech to text process, a human that transcribes the audio signal by typing or other methods, and/or a combination of a human and automated CA. An example of a speech to text process is described in U.S. Pat. No. 9,444,934, filed on Oct. 2, 2014, and incorporated herein by reference in its entirety. According to the various embodiments disclosed herein, segmenting of an audio signal can decrease the delay of time (or latency) in which the display device of the hard of hearing party receives text that is associated with the audio signal. That is, the output of text can more closely match the timing of audio that is sent to the hard of hearing party. Accordingly, a conversation/voice call can flow more naturally. Additionally, CAs working at a call relay or CTS center can process calls more efficiently, reducing idle times of CAs and leading to a greater number of calls being handled by a fewer number of CAs. Therefore, the current disclosure is directed to a method, system, and computer-readable medium for a segment-based queuing for audio captioning that can reduce latency of text being sent to a hard of hearing party in response to an audio signal from another party.

The segment-based queuing for audio captioning disclosed herein is not limited to a telephone relay or CTS application. Segment-based queuing for audio captioning may be used in any setting or application where an audio signal is transcribed to text. For example, segment-based queuing for audio captioning may be used in television captioning, transcriptions of communications such as 911 calls and/or radio communications of aircraft and/or emergency personnel, court reporting, archiving and quality monitoring of customer service calls, and more. In other examples, the systems and methods herein may be used in embodiments where text is not produced. In one example, an interactive voice response (IVR) system may be used for automated inbound or outbound calls. In an IVR, the system listens to an audio signal to determine a response. For example, the IVR may ask a caller whether they have an existing account with the company associated with the IVR. The IVR can then listen for a "Yes" or "No" response from an audio signal from the caller. Other types of prompts and/or responses may be utilized by an IVR. When the caller responds to a prompt, the IVR may not be able to understand the caller's response. The IVR system may then treat the response from the caller's audio signal as a segment of audio that is dispatched to a CA for comprehension. The output from the CA may be text or some other output. For example, the CA may comprehend the response and, instead of merely reproducing the text of the request, may instead take an action based on the response. If a caller asks for a company's human resources (HR) department in the response, the CA may transfer the caller to the HR department (or may send a command to the IVR system that instructs the IVR system to transfer the caller to the HR department.

In an illustrative embodiment in the telephone relay or CTS context, a caller may place a call. A participant in the call may be hard of hearing. The hard of hearing participant may place the call or receive the call. In a telephone relay or CTS call, the hard of hearing participant is equipped with a special telephone that can display data or text. When the hearing participant speaks through their normal telephone, the words the hearing participant speaks are transcribed into text that is sent to the special telephone of hearing participant. In other words, captions can augment a telephone call. In an illustrative embodiment, audio voice signals of the hearing participant and the hard of hearing participant are sent between the normal telephone and the special telephone, respectively. Thus, the hard of hearing participant receives at their special telephone both a text signal that is output on a display and the audio voice signal from the hearing participant. If the hard of hearing participant is able to speak, the hard of hearing participant is able to talk to the hearing participant normally, and the audio voice signal from the hard of hearing participant is transmitted directly to the hearing participant.

As defined throughout the present application, a special telephone may be a variety of devices, software, and implementations of a relay service or CTS. For example, a special telephone as disclosed herein may be a mobile phone, a captioned telephone, a personal computer, a tablet, or any other sort of telephonic device. For example, a smart mobile phone may have stored upon it a web browser or a specific software application. The web browser may be directed to a web page that facilitates calling and any of the features or methods disclosed herein. The specific software application on a mobile phone may also facilitate any of the features or methods disclosed herein. A personal computer, such as a desktop or laptop computer, may also have stored upon on it a web browser or specific software application that facilitates any of the features or methods disclosed herein. In some embodiments, the specific software application may be a browser based specific application, such as a web-based captioning software (e.g., WebCapTel™). In other embodiments, a captioned telephone, such as a CapTel™ phone, may be used. A captioned telephone may utilize a public switched telephone network (PSTN) or operate through an internet protocol (IP) connection. In other embodiments, a special telephone, as the term is used herein, could also be one or more devices. For example, a normal telephone may be used, and text or captions could be displayed on a different display device, such as a tablet or other computing device. Accordingly, in a special telephone, as the term is used herein, a display may or may not be integrated with the telephone functionality itself into a single device. Other devices than the devices listed here may also be used in combination with systems and methods disclosed herein.

Often, the transcribed text of the hearing participant's audio voice signal is generated at least in part due to a communication assistant (CA). The CA can help generate the transcribed text in different ways. In one illustrative embodiment, the CA hears the audio voice signal from the hearing participant, and types the words heard into a keyboard, which results in the transcribed text being output to the special phone of the hard of hearing participant. In another illustrative embodiment, the CA hears the audio voice signal and re-speaks the words heard into a speech to text device. The speech to text device can be trained for the CA, and/or the CA can be trained to speak with the proper diction, frequency, pace, etc. to ensure accuracy in transcribing the speech to text. In other embodiments, the CA may be automated and transcribe speech of a call participant using a speech to text process automatically.

FIG. 1A is a process flow diagram demonstrating a captioned telephone service (CTS) in accordance with an illustrative embodiment. In alternative embodiments, fewer, additional, and/or different components may be included in the system. FIG. 1A shows a telephone 100, a communication assistant (CA) device 105, and a special telephone 110. As noted above, the special telephone 110 may include a number of different embodiments. In other words, several different physical implementations of a special telephone may be utilized as the special telephone 110. The telephone 100 is a standard telephone that can be used by a hearing participant in a call. The telephone 100 and the special telephone 110 both send and receive audio to each other. This connection is through a network such as a public switched telephone network (PSTN). Such a network may also be effected through any method, such as land communication lines, fiber optic cables, telephone networks, satellite communications, the internet, cellular networks, radio or wireless internet frequencies, and the like, or any combination thereof. The CA device 105 is connected to the special telephone 110, and the connection may also be through a network. The network that connects the CA device 105 and the special telephone 110 may be the same as the network that connects the telephone 100 and the special telephone 110, it may be different, or the connections may share some, but not all, components. The special telephone 110 can send audio to the CA device 105 that can be comprehended at the CA device 105. For example, text can be sent back to the special telephone 110 for display to a call participant. In alternative embodiments, the telephone 100 may be a special telephone similar to the special telephone 110 with added functionalities such as receiving, sending, and/or displaying text. The CA device 105 may be automated, operated by a human, or a combination of the two as disclosed herein.

Figure 1B:
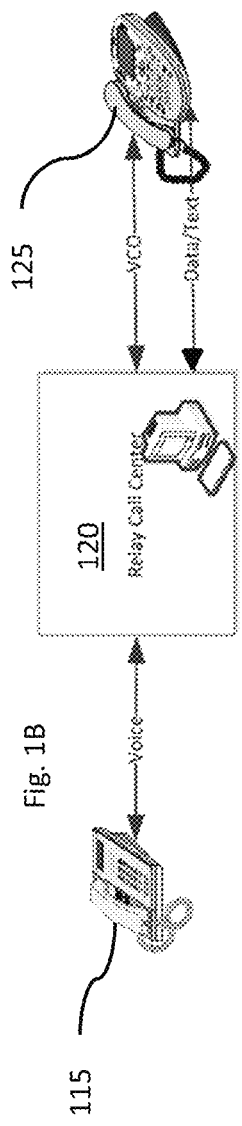
FIG. 1B is a process flow diagram demonstrating a telephone relay system in accordance with an illustrative embodiment.

FIG. 1B is a process flow diagram demonstrating a telephone relay system in accordance with an illustrative embodiment. In alternative embodiments, fewer, additional, and/or different components may be included in the system. FIG. 1B shows a telephone 115, a relay call center 120, and a special telephone 125. As noted above, the special telephone 125 may include a number of different embodiments. In other words, several different physical implementations of a special telephone may be utilized as the special telephone 125. The telephone 115 is a standard telephone that can be used by a hearing participant in a call. The telephone 115 and the special telephone 125 are both connected to the relay call center 120. This connection is through a network such as a public switched telephone network (PSTN). Such a network may also be effected through any method, such as land communication lines, fiber optic cables, telephone networks, satellite communications, the internet, cellular networks, radio or wireless internet frequencies, and the like, or any combination thereof. The relay call center 120 serves as an intermediary for relaying communications between the telephone 115 and the special telephone 125. The telephone 115 can send and receive voice signals to the relay call center 120. In alternative embodiments, the telephone 115 may be a special telephone similar to the special telephone 125 with added functionalities such as receiving and displaying text from the relay call center 120.

The relay call center 120 includes a computing device that receives an audio voice signal from the telephone 115 and an audio voice signal from the special telephone 125, and receives input from a communication assistant (CA) that is output to the special telephone 125 and is text representing the audio voice signal received from the telephone 115. The relay call center 120 can include one or more devices that are capable of implementing the various systems and methods disclosed herein for segment-based queuing for audio captioning, which will be described in further detail below and with respect to the other figures. The relay call center 120 transmits the audio voice signal from the telephone 115 to a speaker on the special telephone 125. The relay call center 120 also transmits the audio voice signal from the special telephone 125 to the telephone 100. Thus, a hard of hearing participant using the special telephone 125 can still attempt to hear a participant speaking using telephone 115. Further, the hard of hearing participant can speak normally through the special telephone 125 and the participant using the telephone 115 will be able to hear the audio voice signal through a speaker on the telephone 115. The speaking of a hard of hearing participant is sent to the relay call center 120 as voice carry over (VCO). The VCO in FIG. 1B also includes the speaking of the user of the telephone 115. In an alternative embodiment, if the hard of hearing participant is unable to speak, the special telephone 125 is equipped with a text entry function, which allows the non-speaking participant to communicate text to the relay call center 120. A CA at the relay call center 120 can then read the text sent from the special telephone 125 and read aloud the text, and the read aloud audio signal is transmitted to the speaker of the telephone 115. In such an embodiment, the system may function as a text to speech application. In other words, text from the non-speaking party may be turned into speech for the speaking party. In the same ways that queuing is described herein for transcribing and audio signal into text, a text string may also be queued so that one or more CAs may speak the text (i.e., turn the text into an audio signal).

FIG. 2 is a diagram demonstrating a captioning service using two communication assistants (CAs) in accordance with an illustrative embodiment. An audio signal generation device 205 sends an audio signal from a caller. The audio signal generation device 205 may be, for example, a telephone or other device equipped with a microphone, processor, and transmitter. The audio signal from the audio signal generation device 205 include segments 225, 230, 235, and 240. In FIG. 2, the segments 225, 230, 235, and 240 are transcribed by a communication assistant (CA) 210, as shown by text strings 250, 255, 260, and 265. In some embodiments, the system may or may not recognize the individual or segmented nature of the segments 225, 230, 235, and 240. In other words, audio may be streamed to the CA 210 agnostic of particular segments. In some embodiments, the CA 210 may pause such a stream if the CA gets behind on transcribing segments 225, 230, 235, and 240. FIG. 2 shows that (if the left of FIG. 2 occurs first in time and the right of FIG. 2 occurs last in time), the text strings 250, 255, 260, and 265 are output by the CA 210 after the audio signal segments 225, 230, 235, and 240 are sent to the CA 210. The text strings 250, 255, 260, and 265 are output to a text display device 220, such as a special telephone as disclosed herein. In various embodiments, the text display device 220 may be any other kind of text display device or a text storage device. In FIG. 2, the system does not need to identify the individual segments 225, 230, 235, and 240 of the audio signal because the audio signal is streamed to the CA 210 as it arrives from the audio signal generation device 205.

By the time the text strings 250, 255, 260, and 265 are output to the text display device 220, there may be a significant delay or latency 270, which is disadvantageous. If the single CA 210 is working on transcribing segments 225, 230, 235, and 240, significant delay or latency can occur because the CA 210 transcribes each segment as it's received, and must complete the transcription of each of the segments 225, 230, 235, and 240 one at time. In other words, in some embodiments, the CA 210 cannot move on to transcribing the segment 230 until the transcription of the segment 225 is complete. As further segments continue to come in to the CA 210 for transcription, the delay or latency 270 can continue to increase, causing displayed text at the text display device 220 to be displayed long after associated audio is received at the text display device 220. Furthermore, other CAs, such as a CA 215, may be idle as shown by idle time 275 if there are no other calls to handle, which can be an inefficient usage of available resources. This can be additionally problematic because both of the CAs 210 and 215 may draw a wage or salary, so the inefficiency of the system shown in FIG. 2 may lead to loss of money in addition to the other drawbacks.

Figure 3:
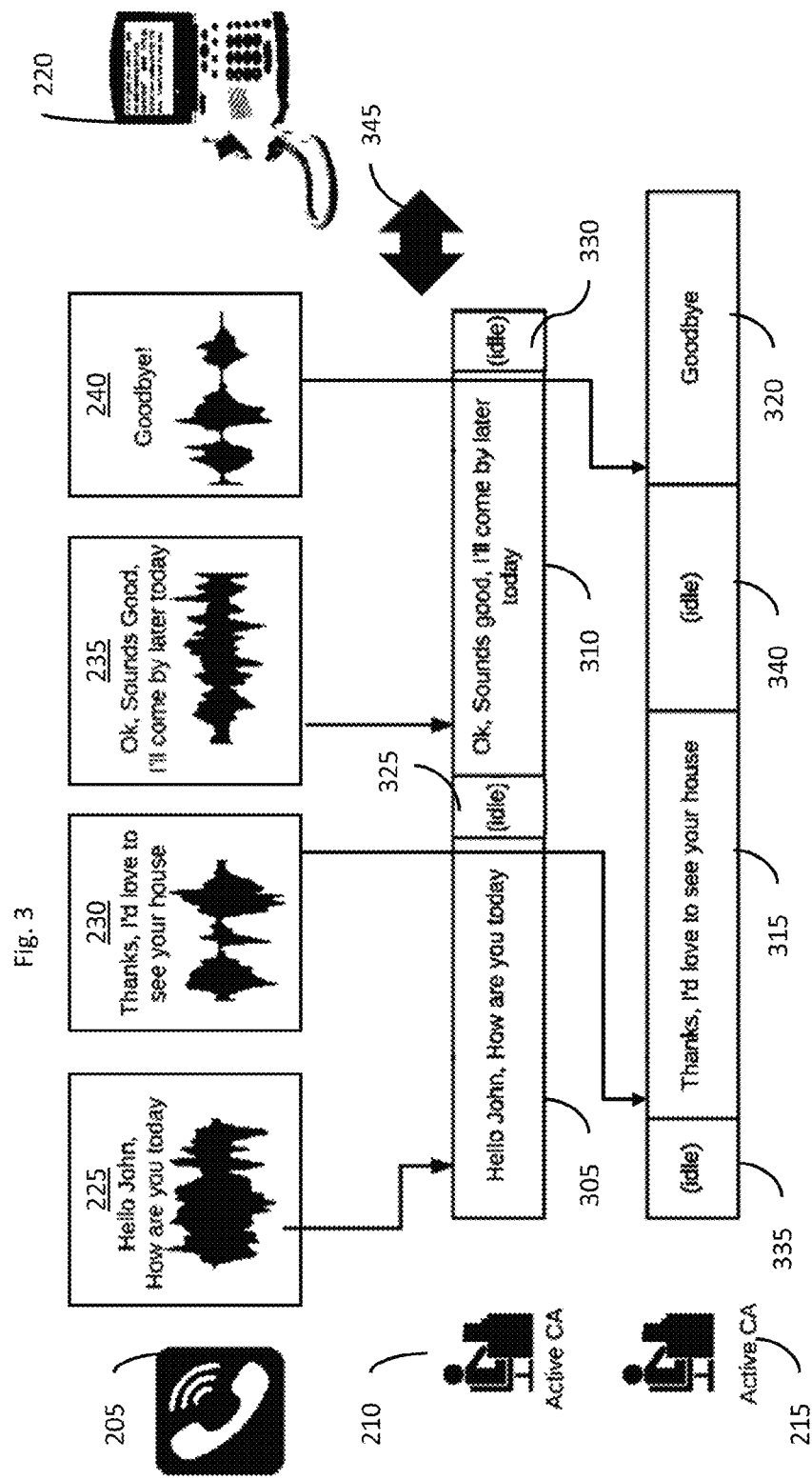
FIG. 3 is a diagram demonstrating another example of a captioning service using two communication assistants (CAs) in accordance with an illustrative embodiment.

FIG. 3 is a diagram demonstrating another example of a captioning service using two communication assistants (CAs) in accordance with an illustrative embodiment. FIG. 3 includes, similar to FIG. 2, the audio signal generation device 205 from which the segments 225, 230, 235, and 240 are received. FIG. 3 also includes the CAs 210 and 215 and the text display device 220, similar to FIG. 2. In FIG. 3, the system segments the audio from the audio signal generation device 205 into the segments 225, 230, 235, and 240. Because, as described below and in contrast to FIG. 2, the segments 225, 230, 235, and 240 may be sent to either CA 210 or CA 215, the system must actually identify the segments 225, 230, 235, and 240. The system may identify the segments in a variety of ways as disclosed herein. For example, the system may identify the first segment 225 by identifying when the audio of the segment 225 has ended. That is, the system may detect silence from the audio signal coming from audio signal generation device 205, which may be a hearing party device. In this way, as the segment 225 is received from the audio signal generation device 205 it can be sent to the first CA 210, and the system can continue to stream the segment 225 to the first CA 210 until the system determines that the segment 225 has ended. Upon determining that the segment 225 has ended, the system can detect the beginning of the segment 230 and begin streaming it to the CA 215. The beginning of a new segment may be determined by detecting the start of sound from the audio signal coming from the audio signal generation device 205, which may be a hearing party device. Accordingly, while the CA 210 is still transcribing the segment 225, as shown at text string 305, the CA 215 can begin transcribing the segment 230, as shown at text string 315.

In various embodiments, additional ways to determine audio segments may be used instead of, in addition to, or in combination with the method described above of detecting silence or the beginning of audio (e.g., speaking) from the audio signal generation device 205. For example, during a conversation between the two devices of FIG. 3, the system may also detect an audio signal (e.g., speaking) or silence on the audio signal from a hard of hearing device, such as one associated with the text display device 220. A segment from the audio signal generation device 205 that needs to be transcribed begins when the audio signal from the hard of hearing device goes silent. Similarly, the segment is determined to have ended when the audio signal from the hard of hearing device goes silent.

Another example of how segments may be determined depends on the length of segments. For example, the system may be set up to allow a maximum segment length. The system may determine a segment each time a hearing party, using the audio signal generation device 205 for example, speaks. However, if the hearing party speaks for a long time without interruption from the hard of hearing party, the segment may be very long. Accordingly, the system may implement a rule for maximum segment length. In this way, segments that exceed the maximum allowed segment length may be broken up into multiple segments. For example, a maximum segment length could be anywhere from 5-60 seconds, including for example, 5, 10, 15, 20, 25, 30, 35, 40, 45, 50, 55, or 60 seconds. Similarly, a rule could also impose a minimum segment length, such that if a determined segment is too short, it may be grouped with the next determined segment. For example, often in conversation a party may affirm what the other is saying with a short, "yeah," "uh-huh," or the like. The system may include such audio with an adjacent segment due to the short nature of the segment. For example, any determined segment of 0-5 seconds may be determined as short enough to include with an adjacent segment, including for example, 0.25, 0.5, 0.75, 1, 1.5, 2, 2.5, 3, 3.5, 4, 4.5, or 5 seconds.

In various embodiments, the system may at times, using any of the criteria described herein, cause a segment to overlap in time with one or more other segments. For example, the first CA 210 may start to transcribe the segment 225, and there might not be a clean indicator determined by the system that the segment 225 has ended (e.g., detection of silence and/or speaking on from one the audio signal of one of the devices). Therefore, when the system creates or identifies a beginning of the segment 230, a first portion of time (e.g., 0.5, 1, 1.5, 2, 2.5, 3 seconds or anything between 0-3 seconds) of the segment 230 might be identical to the last 2-3 seconds of segment 225. For example, a hearing participant may recite a long dictation in which they speak constantly for a large number of seconds/minutes. In this case, the audio may be segmented by employing a maximum segment length as described above. However, such a rule may chop the audio in the middle of a word spoken by the hearing party, and so it could be valuable to the first CA 210 processing the current segment (the segment 225) and a second CA processing a subsequent segment to have a couple of seconds overlap so that they do not miss any words. The system may then optionally merge any of the transcription overlap between the two segments, so the that the text ultimately displayed to the hard of hearing party is accurate. For example, in an overlap scenario, the hearing person speaks the sentence "I like to watch tele%vision in my pajamas," where the % (percent) symbol indicates within the audio stream where a segmentation occurred. Without an overlap of segments, both the first segment CA and the second segment CA may miss the boundary word of "television" because neither of them could hear the whole word. With overlap, the first CA would transcribe "I like to watch television," and the second CA would transcribe "television in my pajamas." The system would then merge these two strings together and recognize that it should merge the two transcriptions in a way that only delivers a single "television" to the hard of hearing party display device. Thus the system would not send "I like to watch television television in my pajamas," but would rather send "I like to watch television in my pajamas."

Similarly, as the system detects the third segment 235, the third segment can be streamed to the CA 210 while the CA 215 is still transcribing the segment 230. Therefore, the CA 210 can begin transcribing the segment 235 into the text string 310 while the CA 215 is still transcribing the segment 230. The segment 240 may be streamed to the CA 215 in a similar manner. The text strings 305, 310, 315, and 320 can be sent to the text display device 220 as they are completed by the CAs 210 and 215 so that they arrive at the text display device 220 in the order in which the audio segments are received from the audio signal generation device 205. Streaming to and transcribing the segments 225, 230, 235, and 240 to the CAs 210 and 215 in the manner of FIG. 3 can reduce an overall delay 345 of the transcriptions, and decrease the overall idle time of the CAs as evidenced by idle times 325, 330, 335, and 340. This reduced latency/delay can advantageously provide better alignment between audio and received text at the text display device 220.

In various embodiments, any number of calls may be handled by any number of CAs, and a CA may be streamed a new segment of any call as soon as they complete a segment or the CA is idle. In other words, segments that need to be transcribed may be queued and sent to an available CA, such that segments are transcribed as efficiently and with as little delay as possible. When segments are queued, the segments may be cleared from a queue in the order that they went into the queue. In some embodiments, if a call accrues a significant delay, segments from that call may be cleared from the queue sooner than other segments that may have entered the queue first so that the call can reduce its delay, and the CAs transcribing catch up quickly. That is, at times, segments from a particular audio signal may be prioritized in a queue. However, the system still tracks the segments from any specific audio signal and/or phone conversation, so that even if a segment that is later in a phone conversation/audio signal is transcribed before an earlier segment, the conversation or text strings are still output to a display device or storage in the order in which the segments occurred in the audio signal.

Figure 4:
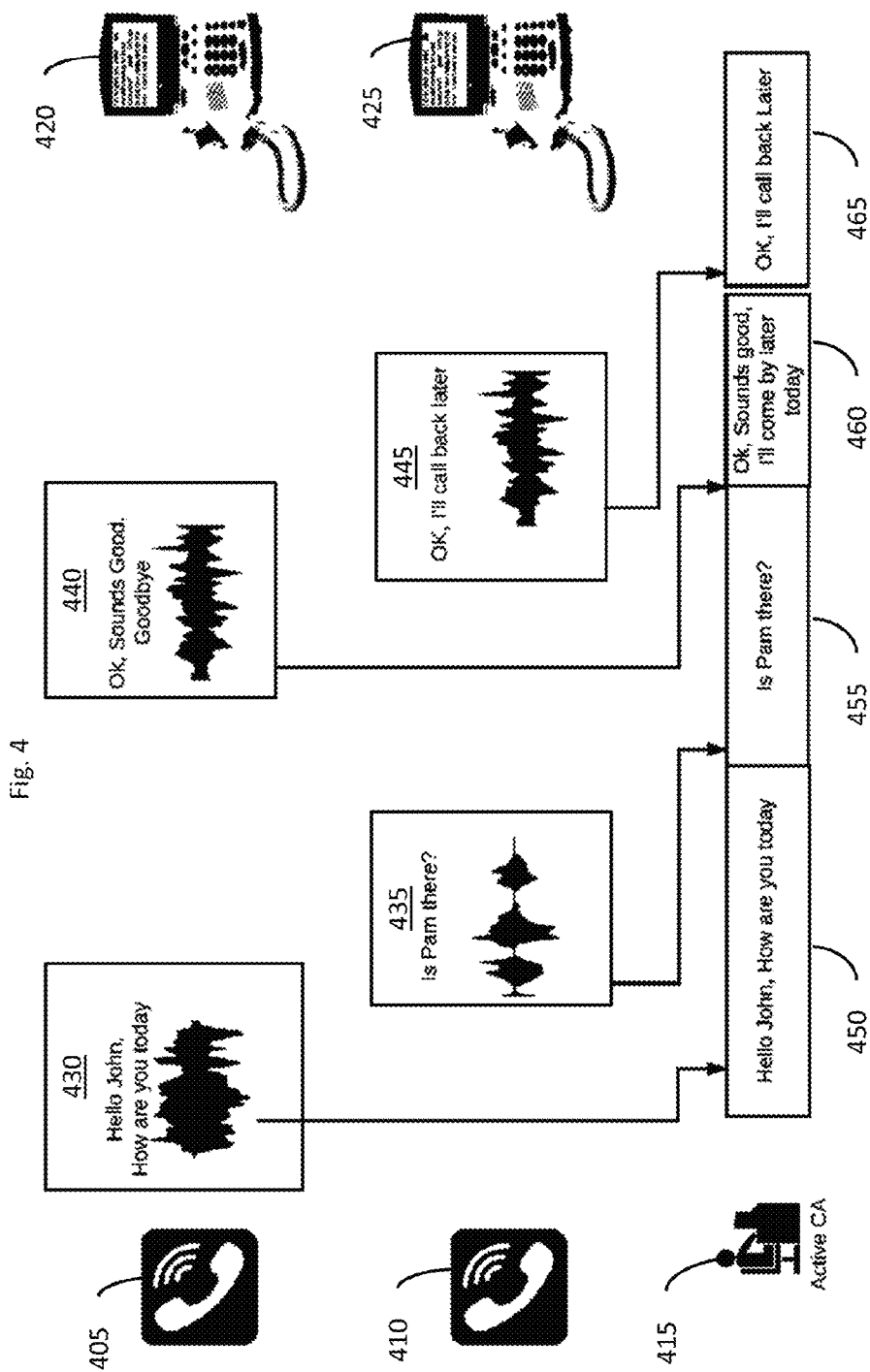
FIG. 4 is a diagram demonstrating a captioning service that minimizes idle time of a communication assistant (CA) in accordance with an illustrative embodiment.

FIG. 4 is a diagram demonstrating a captioning service that minimizes idle time of a communication assistant (CA) in accordance with an illustrative embodiment. In FIG. 4, a CA 415 handles segments from multiple audio signals received from an audio signal generation device 405 and an audio signal generation device 410. Such a system is advantageous because, for example, if only a hearing party to a phone call is to be transcribed, there may be significant delays or idle time for a CA when the hard of hearing party is speaking.

In FIG. 4, an audio signal is received from the audio signal generation device 405, and includes first a segment 430 and then a segment 440. The segments 430 and 440 are to be transcribed into text strings 450 and 460, and output or sent to a text display device 420. Similarly, a second audio signal is also received from the audio signal generation device 410, and includes first a segment 435 and then a segment 440. The segments 435 and 445 are to be transcribed into text strings 455 and 465, and output or sent to a text display device 425. FIG. 4 shows segments from only two calls, and only two segments from each call. In various embodiments, a single call there are potentially any number of segments, and new segments are created/identified throughout the entire duration of a call. Similarly, more than two calls with any number of segments may be sent to a CA for transcription. Accordingly, as with all of the description and drawings herein, the example of FIG. 4 depicts a finite number of segments and calls that are illustrative of and are not meant to limit the number of segments or calls that may be used according to the systems and methods disclosed herein.

From the perspective of the CA 415, a segment 430 of the first audio signal is first streamed to the CA 415. The CA transcribes the segment 430 into the text string 450. As the CA 415 transcribes the segment 430, the system also identifies and receives the segment 435, and queues it up for a CA, in this embodiment the CA 415. A segment can be queued as soon as the segment begins. That is, an end of a segment need not be determined before the system queues the segment for a CA. Once the CA 415 is done transcribing the segment 430 into the text string 450, the queued up segment 435 is sent to the CA to be transcribed into the text string 455. Similarly, the segments 440 and 445 can be queued up, sent to the CA 415, and transcribed by the CA 415 into the text strings 460 and 465, respectively. As the text strings 450, 455, 460, and 465 are being completed, the text is sent to the proper text display device. For example, the text strings 450 and 460 are sent to the text display device 420 as they are being completed, and the text strings 455 and 465 are sent to the text display device 425 as they are being completed. In other words, the system can stream the transcriptions of the CAs to the proper display devices to minimize delay/latency between the audio signal and displayed text. In this way, a CA may transcribe segments from more than one conversation, which advantageously can reduce delay in text strings sent to text display devices and reduce idle time of a CA.

In various embodiments, the systems, methods, and computer readable mediums described with respect to FIGS. 2, 3, and 4 may be used in combination with each other. For example, multiple CAs may transcribe segments from the same call/audio signal, and in addition any of those multiple CAs may transcribe individual interspersed segments from multiple calls/audio signals. Such a process may be determined by a queue. That is, a segment may be sent to any CA that is idle irrespective of what audio signal and/or conversation the segment is part of. In another example, a conversation and or audio signal segment may have one or more CAs that are prioritized to receive segments from a particular audio signal, such that repeated segments from the same audio signal may provide a flow or context of a conversation to aid a CA in transcribing an audio signal into text strings. For example, if the CA is human, it may remember topics from previous segments that inform how an audio signal should be transcribed. In another example, if the CA is automated, a speech to text profile may be used to determine text strings, and once a speech to text profile is selected, the specific rules of that profile may be used to transcribe the audio signal. In various embodiments, the same audio segment may be sent to multiple CAs, where CAs may be human and/or be automated. Transcriptions produced by these multiple CAs may be used to identify and improve caption accuracy and CA performance, and may or may not be delivered to be displayed as text. For example, if a segment is sent to three CAs and the transcription of two of the CAs were identical matches and the third CA produced an alternative transcription, the system may infer that the two transcriptions that were identical are more accurate, and deliver the more accurate transcription to the display device of the hard of hearing party. Additionally, the CA that produced the alternate transcription might be flagged as possibly needing better training. Similarly, such a system may be used to determine an accuracy or quality rating of a CA. For example, the system may determine a percentage of segments of a first CA that match the transcriptions of a second CA. In another example, the system may determine a percentage of words in transcriptions of the first CA match words in the transcriptions of the second CA.

Figure 5:
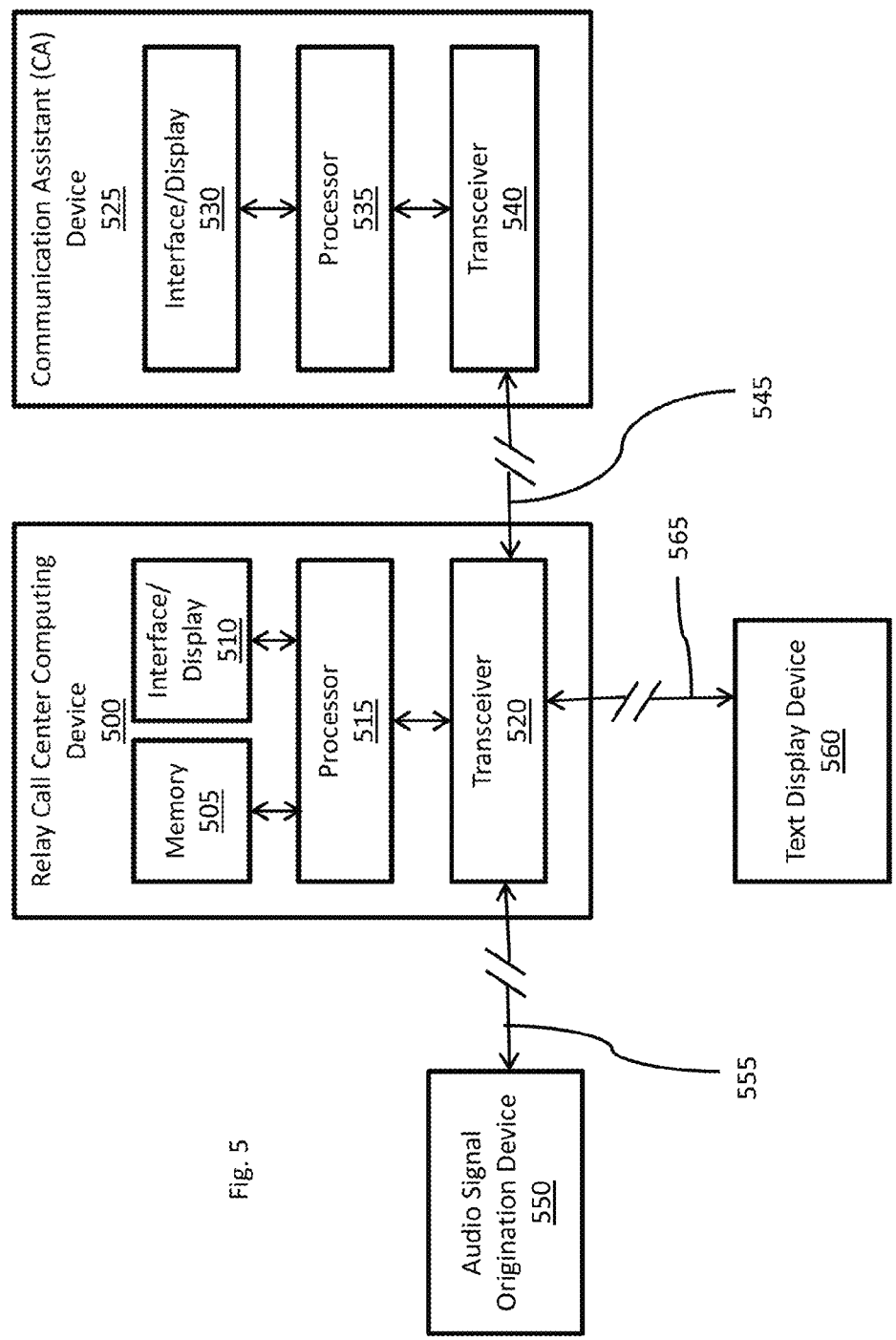
FIG. 5 is a block diagram illustrating computing devices that may be used in an audio captioning system in accordance with an illustrative embodiment.

FIG. 5 is a block diagram illustrating computing devices that may be used in an audio captioning system in accordance with an illustrative embodiment. In alternative embodiments, fewer, additional, and/or different components may be included in the system. In FIG. 5, there is a relay call center or CTS computing device 500, a communication assistant (CA) device 525, an audio signal origination device 550, and a text display device 560. The relay call center or CTS computing device 500 includes a processor 515 that is coupled to a memory 505. The processor 515 can store and recall data and applications in the memory 505. The processor 515 can execute sets of instructions stored on the memory. In one example, a set of instructions may be an application that segments audio signals, queues the segments, sends the segments to various CA devices, receives text strings, stores and uses various speech to text profiles to automatically transcribe an audio voice signal, and sends text strings to text display devices as disclosed herein throughout. The memory 505 may store more than one application. The processor 515 may also display objects, applications, data, text, inputs from a keyboard or microphone, etc. on an interface/display 510. The processor 515 is also coupled to a transceiver 520. With this configuration, the processor 515, and subsequently the relay call center or CTS computing device 500, can communicate with other devices, such as the CA device 525 through a connection 545, the audio signal origination device 550 through a connection 555, and the text display device 560.

In an alternative embodiment, all or part of the memory 505 may exist outside the relay call center or CTS computing device 500 as a separate database. The database may be accessed by the relay call center or CTS computing device 500 similar to the way memory 505 is accessed or similar to the way connection 545 operates as between two transceivers.

The CA device 525 includes a processor 535 that is coupled to an interface/display 530. The processor 535 is also coupled to a transceiver 540. With this configuration, the processor 535, and subsequently the CA device 525, can communicate with other devices, such as the relay call center or CTS computing device 500 through the connection 545. The CA device 525 may also include a memory similar to the memory 505 of the relay call center or CTS computing device 500. In some embodiments, the CA device 525 and the relay call center or CTS computing device 500 may share a memory, processor, transceiver, interface/display, and/or processor. That is, in some embodiments, various aspects of the CA device 525 and the relay call center or CTS computing device may be consolidated. The interface/display 530 may include input device(s) like a keyboard and/or microphone so that text strings may be generated. The interface 530 may also include a display that can show what text is being input by a human CA and/or may show suggested text strings determined by a speech to text process of an automated CA.

The audio signal origination device 550 may also be any type of device, such as a smart phone, laptop, tablet, personal data assistant, microphone, telephone, tape recorder or other recording device, or other type of device. In an alternative embodiment, the audio signal origination device 550 may be omitted. For example, in a court-reporting embodiment, an audio signal may be heard by a human CA and then transcribed using a CA device. Thus, in such an embodiment, a device such as the audio signal origination device 550 may not be utilized to capture audio.

The text display device 560 may be a special telephone such as one of the special telephones discussed herein. In an alternative embodiment, the text display device 560 may be a smart phone, desktop computer, laptop computer, tablet, personal data assistant, or other electronic device. In some embodiments, the text display device 560 may be any type of device that displays text. In some embodiments, where audio signals are being recorded, archived, stored, etc. the text display device may be a memory device and/or have memory so that the text strings received can be stored.

The devices shown in the illustrative embodiment may be utilized in various ways. For example, the connections 545, 555, and/or 565 may be varied. The connections 545, 555, and/or 565 may be a hard-wired connection. A hard wired connection may involve connecting the devices through a USB (universal serial bus) port, serial port, parallel port, or other type of wired connection that can facilitate the transfer of data and information between devices, such as between the relay call center or CTS computing device 500 and the CA device 525. In another embodiment, the connections 545, 555, and/or 565 may be a dock where one device may plug into another device. While plugged into a dock, one device may also have its batteries charged or otherwise be serviced. In other embodiments, the connections 545, 555, and/or 565 may be a wireless connection. Such a connection may take the form of any sort of wireless connection, including but not limited to Bluetooth connectivity, Wi-Fi connectivity, or another wireless protocol. Other possible modes of wireless communication may include near-field communications, such as passive radio-frequency identification (RFID) and active (RFID) technologies. RFID and similar near-field communications may allow the various devices to communicate in short range when they are placed proximate to one another. In an embodiment using near field communication, two devices may have to physically (or very nearly) come into contact, and one or both of the devices may sense various data such as acceleration, position, orientation, velocity, change in velocity, IP address, and other sensor data. The system can then use the various sensor data to confirm a transmission of data over the internet between the two devices. In yet another embodiment, the devices may connect through an internet (or other network) connection. That is, the connections 545, 555, and/or 565 may represent several different computing devices and network components that allow the various devices to communicate through the internet, either through a hard-wired or wireless connection. The connections 545, 555, and/or 565 may also be a combination of several modes of connection.

To operate different embodiments of the system or programs disclosed herein, the various devices may communicate in different ways. For example, the relay call center or CTS computing device 500 may download or have installed upon it various software applications, such as an application for segmenting and queuing audio signals as disclosed herein. Such software applications may allow the various devices in FIG. 5 to perform some or all of the processes and functions described herein. Additionally, the embodiments disclosed herein are not limited to being performed only on the disclosed devices in FIG. 5. It will be appreciated that many various combinations of computing devices or specialized telephonic devices may execute the methods and systems disclosed herein. Examples of such computing devices may include desktop computers, cloud servers, smart phones, personal computers, servers, laptop computers, tablets, blackberries, RFID enabled devices, or any combinations of such devices or similar devices.

In an alternative embodiment, programs run by various electronic, computing, and/or telephonic devices may be internet-based applications, where the program is executed by a web browser or other internet enabled application. Temporary files and/or a web browser may be used on the relay call center or CTS computing device 500 or CA device 525 in order to execute a program, system, application, etc. in this manner.

The configuration of the CA device 525, the relay call center or CTS computing device 500, the audio signal origination device 550, and the text display device 560 is merely one physical system on which the embodiments disclosed herein may be executed. Other configurations of the devices shown may exist to practice the disclosed embodiments. Further, configurations of additional or fewer devices than the ones shown in FIG. 5 may exist to practice the disclosed embodiments herein. Additionally, the devices shown in FIG. 5 may be combined to allow for fewer devices or separated where more than the two devices shown exist in a system.

In other embodiments, specialized hardware may exist on the devices shown in FIG. 5 that is specifically designed to perform or execute the various embodiments disclosed herein. For example, a microphone or speaker may be used at the CA device 525 to receive and output audio voice signals. The relay call center or CTS computing device 500 or CA device 525 may also have a display screen that can display text or data. A screen may be a touch screen, capable of receiving inputs from a call participant or a communication assistant (CA). Either of the relay call center or CTS computing device 500 or CA device 525 may have other input hardware such as a mouse, keyboard, touchpad, number pad, rotary dialer, or other buttons for functions such as voicemail, directory, caller id, call forwarding, volume, or the like.

Figure 6:
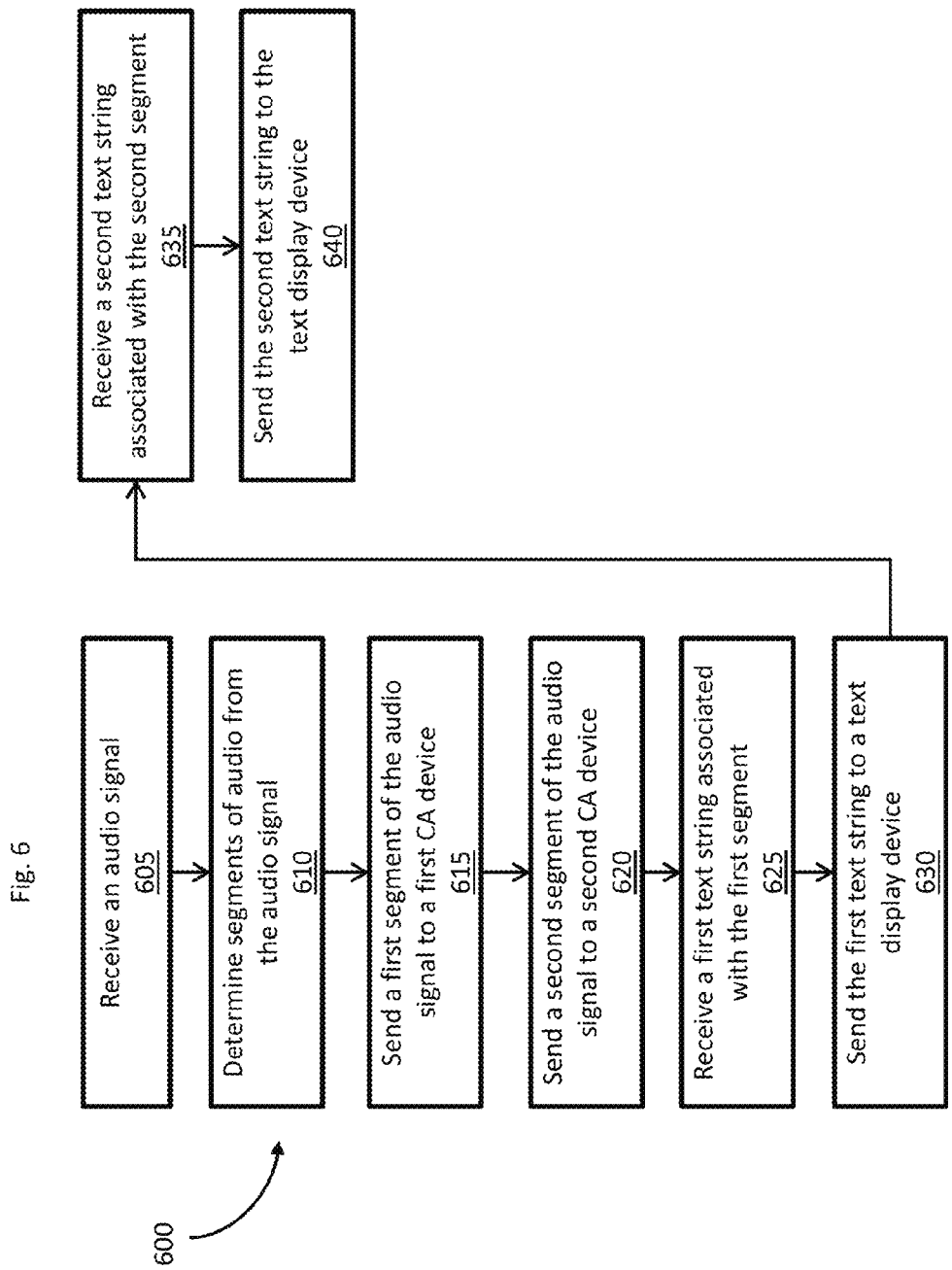
FIG. 6 is a flow diagram illustrating a method of segment-based queuing for audio captioning in accordance with an illustrative embodiment.

FIG. 6 is a flow diagram illustrating a method 600 of segment-based queuing for audio captioning in accordance with an illustrative embodiment. In alternative embodiments, fewer, additional, and/or different operations may be performed. Also, the use of a flow diagram is not meant to be limiting with respect to the order of operations performed. At an operation 605, the system receives an audio signal. For example, the relay call center or CTS computing device 500 of FIG. 5 may receive an audio signal from the audio signal origination device 550 of FIG. 5. The audio signal may be a voice of a call participant, such as a hearing party as disclosed herein. The hearing party may speak into their telephone, and the audio is sent to a relay call center or CTS system as discussed above, for example, with respect to FIG. 1A or 1B. In other words, the audio signal may be received during a voice call and through a communication network. The voice call may be a voice over internet protocol (VoIP) call, a call over a public switched telephone network (PSTN), a local intranet, or any other type of voice call. In various embodiments, other types of audio may be received, such as radio communications, television audio, etc.

In an operation 610, the system determines segments of audio from the audio signal. The segments may be determined in different ways according to various embodiments as described herein. The segments may be determined automatically by a relay call center or CTS computing device. In such embodiments, the relay call center or CTS computing device can identify particular segments in the audio signal. For example, segments may be determined by detecting silence and/or speaking from the one or both of the parties to a conversation. For example, as described above, the system may detect that a segment to be transcribed has begun when a hearing party begins to speak and/or when a hard of hearing party stops speaking. The system may detect that a segment to be transcribed has ended when the hard of hearing party begins to speak and/or when a hearing party stops speaking. In another example, a segment may be a phrase or sentence according to a spoken language. In other words, if the audio signal is of a person talking, the segments may represent words or phrases separated into segments at natural breaking points, such as between phrases, sentences, paragraphs, etc. In various embodiments, two parties may participate in a call. Another possible way to define a segment of an audio signal during a voice call is to define a segment each time one party stops talking and the other beings talking. For example, a first segment may include a first party saying, "Hi. How are you doing today?" Even though the first segment includes two sentences, it may be grouped together because the first party kept talking after the first sentence. In another embodiment, the two sentences may be grouped together in a segment because the first sentence is only one word long. In particular, the system may identify words in a sentence and will group a sentence together with another sentence whenever the sentence has fewer than a predetermined threshold of words. After the first segment with two sentences, the second party may speak, and thus they system will determine and/or detect that another segment, as defined in this example, is starting. For example, the second party may say, "I am doing quite well. However, my dog got sick yesterday and I had to take him to the vet." Those two sentences may be included together in a segment because they were spoken together consecutively without interruption from the first party. In an alternative example, using the predetermined threshold of words, each sentence spoken by the word may be considered a separate segment. For example, the predetermined threshold may be four words. Since the first sentence has five words, and the second sentence has fifteen words, each sentence would be determined to be a separate segment. In various embodiments, the predetermined threshold may be related to time. For example, if series of words identified from an audio signal lasts longer than a predetermined threshold of time, the system may look for a break in sentences to separate the series of words into more than one segment. In another example, the system may track how long, time-wise, a particular sentence is. If it exceeds the predetermined threshold of time, the sentence is considered to be its own segment. In various embodiments, the system automatically determines the segments of audio from the audio signal.

In various embodiments, the system may also use conditional rules to determine segments and/or redefine determined segments. For example, segment boundaries may only be established once a CA is ready to process a next segment in the queue, even if a boundary of that next segment is not yet determined. In other words, the system may iteratively establish and/or refine segment boundaries up until or even immediately following the point that a CA completes the transcription of a segment. For example, the system may initially elect to create a 10 second segment based on a first criteria such as, for example, silence detection. In another, example the 10 second segment may be determined based on a maximum nominal segment length rule (i.e., set a maximum signal length of 10 seconds unless another factor, such as that of the next sentence, is present). Subsequently, the system may update the first determined 10 second segment to a be a 14 second segment if the hearing party speaks for only another 4 seconds after the 10 second segment was determined. Such an update to reclassify the segment may be due to the detection the hard-of-hearing party speaking after the additional four seconds. In such an example, the system considers this indication of turn-taking to be a superior segment boundary. The system may further combine the 4 seconds with the original 10 seconds into one segment because the 4 seconds of audio did not reach the maximum nominal segment length or another predetermined time threshold. For example, if the speaking of the hearing party after the first 10 seconds lasts less than 10 seconds (a maximum nominal segment length), the additional speaking is included in the first segment. In another example, if the additional speaking is less than 5 seconds (a different predetermined time threshold) it is included in the first segment, while additional speaking above 5 seconds may be considered to be a second, separate segment.

In various embodiments, a user may perform or assist in the determination of segments of the audio signal. For example, a speech to text process may be used to determine words said in an audio signal. The words can be displayed on an electronic display, and a user may indicate where break audio into segments. The user may indicate start and end points of a segment or may indicate breaks between segments, where the break signifies both the end of a segment and a beginning of the segment. The user may indicate the segments through a user interface on a computing device, such as a keyboard, mouse, touchscreen, etc. In some embodiments, the user may be the similar to a human CA.

In various embodiments, the segmenting of an audio signal can include both a user input and an automated process. For example, a user may monitor an automated segmenting process and add manual corrections. Manual corrections may be to rejoin segments if, for example, the automated process splits a single sentence into two segments. When a user adds in manual corrections to an automated segmenting process, the system can learn based on the corrections made and apply those changes in the future. Further segmenting processes are disclosed herein.

In an operation 615, the system sends a first segment of the audio signal to a first communication assistant (CA) device. As disclosed herein, the first segment is streamed to the first CA device, such that the whole segment does not need to be received before the segment begins to be sent to the first CA device. Thus, the first segment can also be partially transcribed before the whole segment is sent to the first CA device. In other words, the system begins send the first segment of the audio signal to the first CA device before an end of the first segment is determined. In an alternative embodiment, the system may wait until the entire segment is received before sending the segment to a CA device.

In an operation 620, the system sends a second segment of the audio signal to a second CA device. Similar to the first segment, the second segment can begin stream to the second CA device before the entire second segment is received or the system can wait until the whole second segment is received before sending it to a CA device. If the second segment is streamed, transcribing of the second segment can begin by the CA device before the system even receives the entire second segment. In addition, the second CA device may start receiving and transcribing the second segment before the first segment is completely transcribed by the first CA device. In other words, the system begins sending the second segment of the audio signal to the second CA device while the first text string associated with the first segment is being received from the first CA device. In an alternative embodiment, the system may wait until the entire second segment is received before sending it to the second CA device for transcription.

In an operation 625, the system receives a first text string associated with the first segment from the first CA device. Here, the system receives the transcribed first segment from the CA device. As disclosed herein, the CA device may be fully automated, partially automated, or manually operated for transcription. For example, fully and/or partially automated transcription may be accomplished by using speech to text processes. Partially automated and/or manually operated transcription at the CA device may performed in whole or in part by a user. For example, a user may hear the audio segment on a speaker or headphone, and type the words they hear into the CA device. Those typed words make up the first text string sent back to the system from the first CA device. A segment does not need to be completely transcribed by a CA before associated text is sent to a display device. That is, transcribed text may be streamed to display devices as a CA is completing the transcription of a segment.

In an operation 630, the system sends the first text string to a text display device. In this way, the first text string can be displayed on the text display device and be read by a participant of a call, such as a hard of hearing person. In various embodiments, text strings may be sent to a storage device instead of or in addition to being sent to a text display device. In an operation 635, the system receives a second text string associated with the second segment from the second CA device. The operation 635 operates similar to the operation 625 described above. In an operation 640, the system sends the second text string to the text display device. The operation 640 operates similar to the operation 630 described above. Furthermore, as described herein throughout, additional CA devices may handle various numbers of audio signals, audio segments, etc. As just one example, the system may send a third segment of the audio signal to a third CA device.

FIG. 7 is a flow diagram illustrating a method 700 of determining segments in an audio signal in accordance with an illustrative embodiment. In alternative embodiments, fewer, additional, and/or different operations may be performed. Also, the use of a flow diagram is not meant to be limiting with respect to the order of operations performed. In an operation, 705 the system identifies a first logical gap in the audio signal based at least in part on the amplitude or frequency of an audio signal. In other words, the system determines that the segments of audio from the audio signal are based at least in part on an amplitude or frequency of the audio signal. For example, the first logical gap may be determined where the amplitude of the audio signal is relatively low for at least a predetermined amount of time. Here, the system analyzes the audio signal to determine that an audio signal has characteristics that indicate a break in speech. For example, the system may detect that an amplitude of a signal is lower that a predetermined threshold for a predetermined amount of time, indicating a break in speech. In another example, the system may measure an average amplitude of the audio signal while a participant is speaking. Then, the system can measure the amplitude to look for periods of time in which the amplitude is significantly lower than the average amplitude of the audio, indicating a period of silence or logical gap of one or more of the participants. For example, the system may model changes in amplitude and/or frequency of an audio signal, and the shape of the changes modeling the changes in amplitude and frequency can be used by the system to determine when there is speaking or words associated with an audio signal. In another example, the system may apply a predetermined relative amplitude measure and predetermined time threshold to determine the silence or logical gap. For example, the system may determine a logical gap whenever the amplitude is less than 20% of the average amplitude for at least a duration of three seconds. In various embodiments, the system may be measuring and determining a logical gap based only on an audio signal from a single participant of a call, an audio signal where audio from both participants is combined into a single audio signal, and/or two or more audio signals, one from each participant of a call. In various embodiments, a measure of power of an audio signal may be used similar to amplitude as described above.

In various embodiments, the system may also measure frequency of an audio signal to determine a logical gap in the audio signal. For example, the system may recognize frequencies that are in typical ranges of human speech and know that a logical gap does not exist where such frequencies are being received in the audio signal. Conversely, where a system does not recognize frequencies in an audio signal as being in the typical range of the human voice, the system may identify a logical gap. In some embodiments, the system may use a custom defined frequency range tailored to a call participants voice and/or gender, as different individuals may have different typical frequency ranges of speech based on various factors. In this way, the system may increase its accuracy in determining a logical gap. In a similar embodiment, instead of determining a logical gap based on an absence of human voice frequencies, the system may identify from an audio signal frequencies associated with noise or white noise, indicating that no participant in the call is speaking, and therefore determining the space or logical gap in the speech from the audio signal.

The logical gaps are determined in the method 700 so that the logical gaps are not included in the audio segments to be transcribed. In this way, the system can be more efficient by not including empty space or logical gaps in a segment that is sent to a CA device. That is, only when a participant is speaking does a segment need to be determined and sent to a CA device. In some embodiments, the audio signal may not be speaking, but may be silence, music, sound effects, or any other sound artifact that may be captured that is not speech. The systems and methods herein are designed to determine when there is speech that should be segmented, comprehended, and/or transcribed. In some embodiments, the audio signal may include multiple types of sound such as background noise that does not need to be detected and speech to be detected. In another example, the audio signal may include a song with sung lyrics, where the system disregards audio from the music, but still detects the sung lyrics so that the audio may be segmented for the lyrics to be comprehended and/or transcribed. In the method 700, as discussed further below, segments are defined in relation to the determined logical gaps. Conversely, in other various embodiments, the segments would be defined based on start and end points of the segments themselves, and the spaces or logical gaps in speech can be ignored altogether.

In an operation 710, the system determines that a first segment of the audio signal begins at the end of the first logical gap. At the beginning of a call, the system may assume that a segment begins when a call is initiated. In other embodiments where segments are determined based on a determination that a party is speaking (rather than defined based on logical gaps as in the method 700 described here), the system may determine that the first segment starts when speech is detected and ends when speech is no longer detected. However, according to the operation 710, each segment can be defined by logical gaps determined in the audio signal. In particular, a segment begins at the end of a determined logical gap.

In an operation 715, the system identifies a second logical gap after the first segment in the audio signal based at least in part on the amplitude or frequency of the audio signal. The second logical gap may be determined in any manner, such as those described above with respect to determining the first logical gap in the operation 705.

In an operation 720, the system determines that the first segment of the audio signal ends at the beginning of the second logical gap. In other words, the beginning of a segment can be defined by the end of a determined logical gap as described with respect to the operation 710, and the end of that segment can be defined by the beginning of a new (second) determined logical gap as described here with respect to the operation 720. Accordingly, in this embodiment, the first logical gap and the second logical gap are not considered a part of any segment and are not sent to a CA for transcription.

FIG. 8 is a flow diagram illustrating a method 800 of determining segments of an audio signal using a speech to text process in accordance with an illustrative embodiment. In alternative embodiments, fewer, additional, and/or different operations may be performed. Also, the use of a flow diagram is not meant to be limiting with respect to the order of operations performed. The method 800 is another example of how segments may be defined by a system from an audio signal, so that segments of the audio signal can be sent to CAs for transcription as disclosed herein.

In an operation 805, the system performs a speech to text process on the audio signal. In other words, the system transcribes (or attempts to transcribe) automatically the audio signal into words/text. Then, in an operation 810, the system determines the segments of audio from the audio signal is based at least in part on text resulting from the speech to text process performed on the audio signal. For example, the system may have rules related to sentence structure and syntax that can be used to determine where logical breaks in a series of words or text are, thereby defining the segments. In some embodiments, the speech to text process may utilize a speech to text profile associated with an identity of an originator of the audio signal to increase accuracy of the speech to text process. The speech to text profile can include one or more rules for transcribing the audio signal into the text. The rules are specifically related to the profile that the system has learned or set to more accurately transcribe speech into text for a specific user. Speech to text profiles are discussed at greater length in U.S. Pat. No. 9,444,934, filed on Oct. 2, 2014, and incorporated herein by reference in its entirety.

In an operation 815, the system sends the text resulting from the speech to text process that is associated with the first segment to the first CA device. In this way, the text resulting from the speech to text process may be used to assist the CA in transcribing the audio signal. For example, the results of the speech to text process may be displayed at a computer terminal to a human CA. Similar to other embodiments described herein, the audio signal of a segment may be streamed to the speech to text process as it received, and the system may stream the output of the speech to text process to the CA device. In this way, a whole segment does not need to be determined, and nor does the whole segment have to be put through a speech to text process before the human CA begins transcribing and/or error checking the text associated with a segment. Similarly, any text verified by the human CA through the CA device may be streamed to a text display device before audio associated with a whole segment is received by the system, transcribed by a speech to text process, and/or checked by the human CA. The human CA can input additions, deletions, and/or changes to the text displayed at the CA device. In this way, the CA may be able to more quickly transcribe the audio accurately, than if the human CA was transcribing/typing every word heard in the audio signal segment. In an operation 820, the system receives, from the first CA device, the first text string associated with the first segment. In other words, once the CA's transcription of the first segment is completed, the text string associated with the first segment is received so it can be recombined with other segments from that signal and sent to a text display device of a call participant. The text string received is a corrected version (as corrected by the CA for accuracy) of the text resulting from the speech to text process that was originally sent to the CA device.

FIG. 9 is a flow diagram illustrating a method 900 of determining when to send signals to a CA device in accordance with an illustrative embodiment. In alternative embodiments, fewer, additional, and/or different operations may be performed. Also, the use of a flow diagram is not meant to be limiting with respect to the order of operations performed. The method 900 describes generally how queuing of segments can be accomplished with respect to a particular CA. In other embodiments, a group of CAs may share a queue. In an operation 905, the system determines that an entirety of a first text string associated with a first segment has been received from a first CA device. Similar to how a segment may be streamed to a CA device for transcription, a text string, as determined at the CA device, can be streamed back to the a relay call center or CTS computing device. One purpose for this would be so that the text string can be streamed to a text display device of a call participant. In this way, text may reach the call participant as soon as possible, irrespective of whether a segment's transcription has been completed. In other embodiments, the CA device may wait for an entire segment to transcribed before sending the text string to the relay call center or CTS computing device. Similarly, in some embodiments, the relay call center or CTS computing device may wait until an entire text string relating to a segment is received before sending the text string to a text display device. Regardless, the system determines when an entire text string associated with the first segment has been received at the relay call center or CTS computing device. In an operation 910, the system sends, in response to determining that the entirety of the first text string has been received, another segment of audio signal to the first CA device. In other words, once a text string is completed, another segment is sent to the CA device for transcription. In other embodiments, the system may not wait until a text string is complete to send additional segments. In such an embodiment, the CA device itself may queue audio segments that have not yet been transcribed, and the transcriptions may be completed in an order in which audio segments where received and queued by the CA device. In such embodiments, the system may track a backlog of particular CA devices to determine how much outstanding transcription must be completed by a particular CA. Such information can also be used by the system to determine which CA to send additional audio segments to (e.g., send audio segments to a CA that has the smallest backlog). In a similar embodiment, a density of transcribing for a CA may be calculated. The density of transcribing for a CA represents how much time a CA spends transcribing audio segments compared to how much time a CA spends idle (or not transcribing). The system may send segments or more segments to a CA with relative low density of transcribing as compared to other CAs. A similar concept is discussed below with respect to FIG. 11.

FIG. 10 is a flow diagram illustrating a method 1000 of using signal density in segment-based queuing for audio captioning in accordance with an illustrative embodiment. In alternative embodiments, fewer, additional, and/or different operations may be performed. Also, the use of a flow diagram is not meant to be limiting with respect to the order of operations performed. The method 1000 describes a process that may be used for determining how many CAs to involve in transcribing a single audio signal. In an operation 1005, the system determines a density of the audio signal. The density may be described as the percentage of time in which speech is detected in an audio signal. In an operation 1010, the system sends additional segments of the audio signal to an additional CA device when the density of the audio signal meets or exceeds a certain threshold. The density threshold may be applied to a single source of the audio signal or more than one source. For example, in a relay or CTS call between a hearing and hard of hearing person, the system may only be analyzing the audio from the hearing person. Accordingly, the density threshold for adding an additional CA would be different than where both audio signals from two participants in a call were combined by the system and analyzed for density.

FIG. 11 is a flow diagram illustrating a method 1100 of using idle time in segment-based queuing for audio captioning in accordance with an illustrative embodiment. In alternative embodiments, fewer, additional, and/or different operations may be performed. Also, the use of a flow diagram is not meant to be limiting with respect to the order of operations performed. In an operation 1105, the system determines idle time associated with a first CA device. The idle time is a measure of time during which text associated with the audio signal is not being received from the first CA device. In response to the idle time associated with the first CA device reaching or exceeding a predetermined threshold, the system sends to the first CA device segments from a second audio signal associated with a second voice call in an operation 1110. In other words, if an idle time of a CA reaches a certain level, segments from another audio signal will be sent to the CA. In other embodiments, a measure of density of transcribing may also be used in this way: when a CAs density of transcribing goes down, additional capacity for the CA is inferred by the system and additional segments can be sent to the CA for transcription.

Other embodiments utilizing the systems and methods disclosed herein are contemplated. For example, a CA, following the transcription of a segment may manually request the next available segment in a queue. In another example, a system may observe that a CA is transcribing at a slower than normal pace as compared to other CAs. Such an event could occur due to fatigue of a human CA or other factors. In response to this determination, the system may elect to de-prioritize less efficient CAs from the scheduling/queuing of segments. Advantageously, such prioritization also helps manage an overall system so that latency/delay for all calls is reduced. That is, if a CA gets behind, it may affect the latency of a call. Therefore, by detecting that a CA is slower and scheduling/queuing their segments accordingly, the system overall will deliver more efficient results (i.e., less latency).

In other various embodiments, the system may attempt to limit the number of CAs who perform transcriptions for a particular call, allowing a small number of CAs to concentrate on the same speaker(s), rather than constantly bombarding CAs with segments from many different calls with different speakers. Such a scheme can improve accuracy and speed of transcriptions because a CA may more readily recognize and transcribe words if they are used to a speaker and/or familiar with the context of a call.

In other various embodiments, a system may elect to not perform segment based queuing all the time. For example, the system may typically assign one call per CA, and then if transcription performance suffers for that call (i.e., latency/delay increases or reaches a particular level), the system can send segments to other CAs for the rest of the call or part of the call until the latency is decreased to an acceptable level. The system may also monitor accuracy of a CA, for example, by sending the same segments to multiple CAs. If a CA is known or determined to be inaccurate, multiple CAs may be used for calls associated with the inaccurate CA. Another way multiple CAs transcribing the same segment may be used is to reduce latency on a call. For example, the speed for delivering a segment's transcription may lowered because the text from whichever CA is transcribing the fastest may be streamed to a display. Any errors determined after streaming the text may be corrected after the streaming (i.e., after an additional CA completes transcription for a segment or word). The quality/accuracy/consistency of transcriptions may also be monitored by having captions generated by multiple CAs for the same segment, as described herein.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method according to a set of instructions stored on the memory of a computing device comprising:
   receiving, at a processor of the computing device, an audio signal;
   determining, by the processor, segments of audio from the audio signal;
   sending, by the processor, a first segment of the audio signal to a first communication assistant (CA) device;
   sending, by the processor, a second segment of the audio signal to a second CA device;
   receiving, by the processor, a first text string associated with the first segment from the first CA device;
   sending, by the processor, the first text string to a text display device;
   receiving, by the processor, a second text string associated with the second segment from the second CA device; and
   sending, by the processor, the second text string to the text display device.

2. The method of claim 1, wherein the audio signal is received during a voice call and through a communication network.

3. The method of claim 1, wherein determining the segments of audio from the audio signal is based at least in part on an amplitude or frequency of the audio signal.

4. The method of claim 3, further comprising:
   identifying, by the processor, a first logical gap in the audio signal based at least in part on the amplitude or frequency of the audio signal;
   determining, by the processor, that a first segment of the audio signal begins at the end of the first logical gap;
   identifying, by the processor, a second logical gap in the audio signal based at least in part on the amplitude or frequency of the audio signal; and
   determining, by the processor, that the first segment of the audio signal ends at the beginning of the second logical gap.

5. The method of claim 4, wherein the first logical gap and the second logical gap are not considered a part of any segment and are not sent to the first CA or the second CA.

6. The method of claim 1, further comprising performing, by the processor, a speech to text process on the audio signal, and wherein determining the segments of audio from the audio signal is based at least in part on text resulting from the speech to text process performed on the audio signal.

7. The method of claim 6, wherein the speech to text process utilizes a speech to text profile associated with an identity of an originator of the audio signal, wherein the speech to text profile comprises at least one rule for transcribing the audio signal into the text.

8. The method of claim 6, further comprising sending, by the processor, the text resulting from the speech to text process that is associated with the first segment to the first CA device.

9. The method claim 8, wherein the first text string associated with the first segment received from the first CA device is a corrected version of the text resulting from the speech to text process.

10. The method of claim 1, wherein the processor begins sending the first segment of the audio signal to the first CA device before an end of the first segment is determined by the processor.

11. The method of claim 1, wherein the processor begins sending the second segment of the audio signal to the second CA device while the first text string associated with the first segment is being received from the first CA device.

12. The method of claim 1, further comprising:
   determining, by the processor, that an entirety of the first text string associated with the first segment has been received from the first CA device; and
   sending, by the processor, in response to determining that the entirety of the first text string has been received, a third segment of the audio signal to the first CA device.

13. The method of claim 1, further comprising sending, by the processor, a third segment of the audio signal to a third CA device.

14. The method of claim 1, wherein the processor automatically determines the segments of audio from the audio signal.

15. An apparatus comprising:
   a memory; and
   a processor coupled to the memory; and
   a first set of instructions stored on the memory and configured to be executed by the processor, wherein the processor is configured to:
   receive an audio signal;
   determine segments of audio from the audio signal;
   send a first segment of the audio signal to a first communication assistant (CA) device;

send a second segment of the audio signal to a second CA device;
receive a first text string associated with the first segment from the first CA device;
send the first text string to a text display device;
receive a second text string associated with the second segment from the second CA device; and
send the second text string to the text display device.

16. The apparatus of claim 15, wherein the processor is further configured to determine a density of the audio signal.

17. The apparatus of claim 16, wherein the processor is further configured to send additional segments of the audio signal to a third CA device when the density of the audio signal meets or exceeds a first threshold.

18. A non-transitory computer readable medium having instructions stored thereon that, upon execution by a computing device, cause the computing device to perform operations, wherein the instructions comprise:
instructions to receive an audio signal;
instructions to determine, segments of audio from the audio signal;
instructions to send a first segment of the audio signal to a first communication assistant (CA) device;
instructions to send a second segment of the audio signal to a second CA device;
instructions to receive a first text string associated with the first segment from the first CA device;
instructions to send the first text string to a text display device;
instructions to receive a second text string associated with the second segment from the second CA device; and
instructions to send the second text string to the text display device.

19. The non-transitory computer readable medium of claim 18, wherein:
the audio signal is associated with a first voice call;
the instructions further comprise instructions to determine idle time associated with the first CA device; and
the idle time comprises a measure of time during which text associated with the audio signal is not being received from the first CA device.

20. The non-transitory computer readable medium of claim 19, wherein, in response to the idle time associated with the first CA device reaching or exceeding a predetermined threshold, the instructions further comprise instructions to send to the first CA device segments from a second audio signal associated with a second voice call.

* * * * *